Aug. 11, 1942.  P. G. HAGENBUCH  2,292,374
PORTABLE AIRCRAFT CATAPULT
Filed Sept. 30, 1940  3 Sheets-Sheet 1
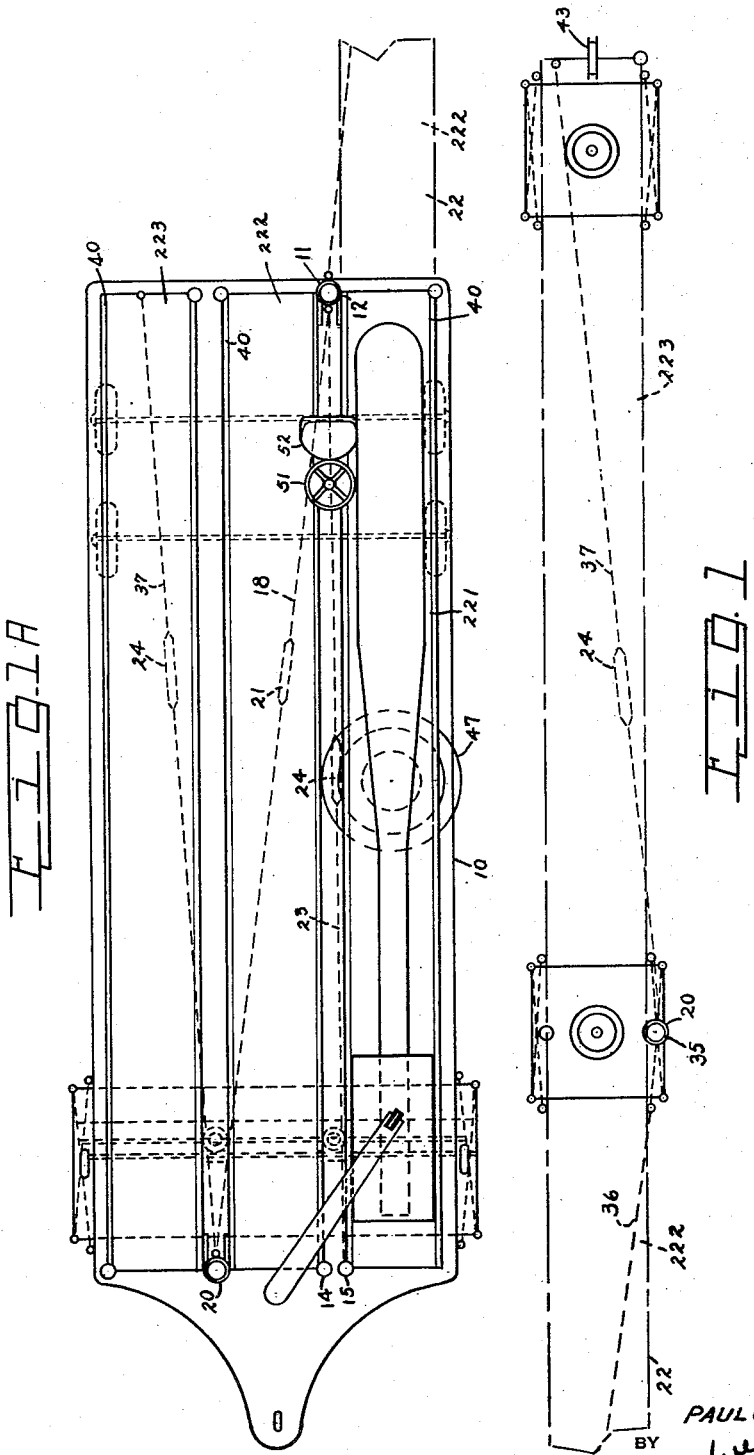
INVENTOR
*PAUL G. HAGENBUCH*
BY
ATTORNEY

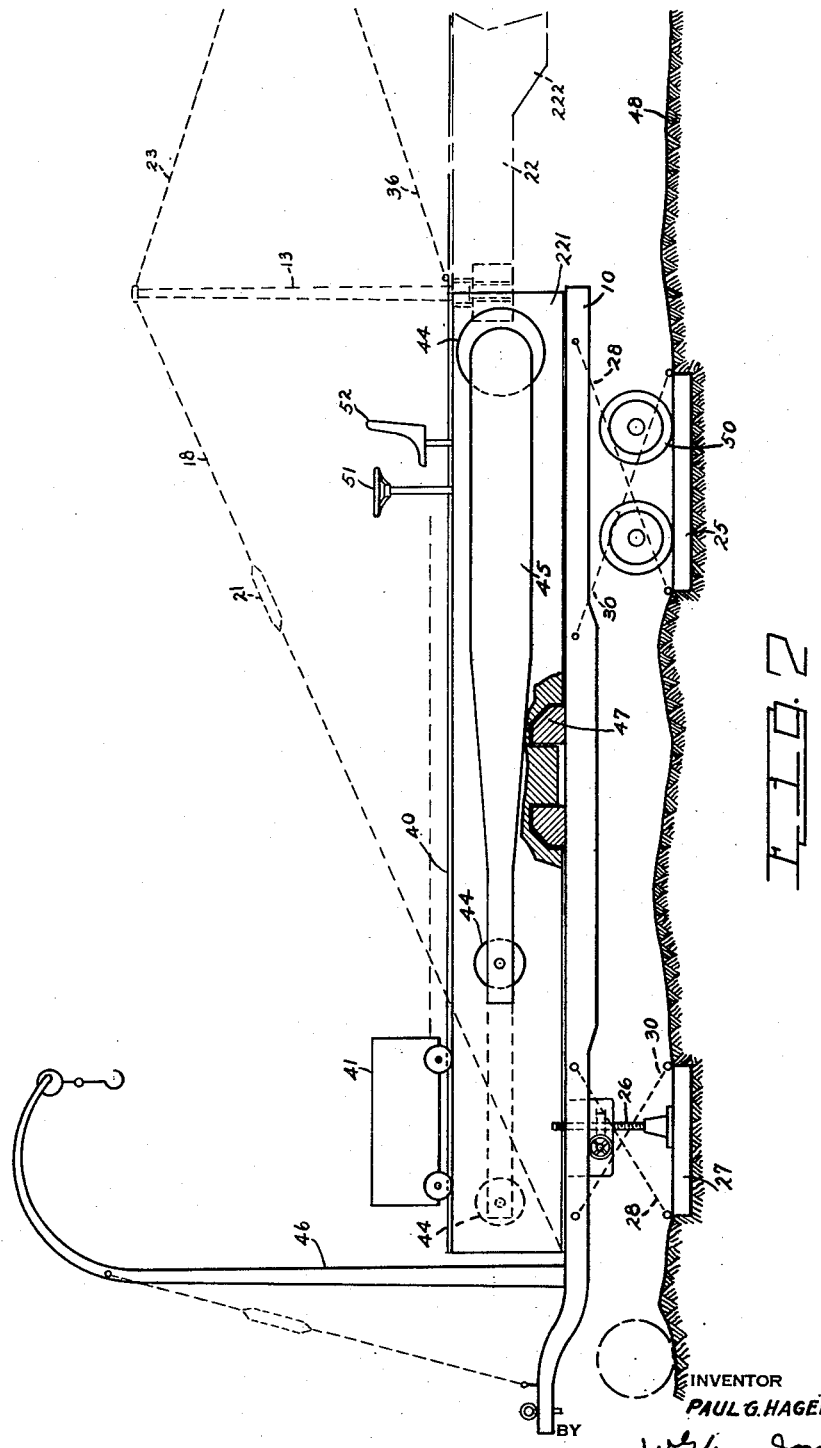

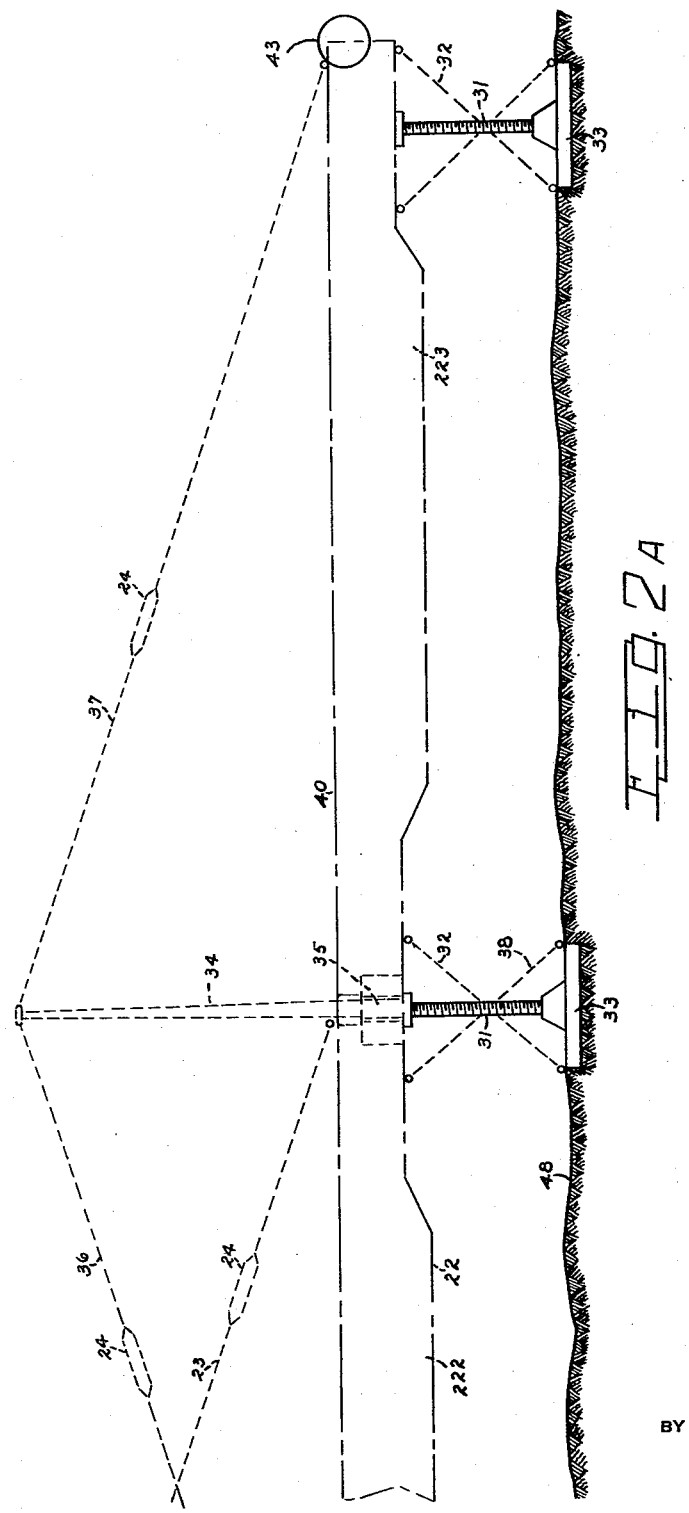

Patented Aug. 11, 1942

2,292,374

UNITED STATES PATENT OFFICE 2,292,374

PORTABLE AIRCRAFT CATAPULT

Paul G. Hagenbuch, Arlington, Va.

Application September 30, 1940, Serial No. 358,971

4 Claims. (Cl. 244—63)

(Granted under the act of March 3, 1883, as amended April 30, 1928; 370 O. G. 757)

This invention relates to a portable aircraft catapult and has for an object to provide a portable means of launching aircraft, which means may be easily transported to any desired location and quickly set up for the purpose of launching or catapulting aircraft into the air. Previous to this invention the only portable type of catapult known was that permanently fixed on shipboard, its portability being provided only by the mobility of the ship. With this invention it becomes possible to provide a catapult that is portable over land areas whereby it may be quickly set up in locations where it is impossible or undesirable to establish permanent air fields.

A further object of this invention is to provide a truck or trailer borne catapult suitable for the launching of aircraft from small clearings such as may be found immediately behind front lines, or that can be cleared in a short time in newly occupied positions where landing fields of sufficient size to permit take-off of airplanes are unavailable.

A further object of this invention is to provide a means of dispersing a plurality of airplanes over a wide adjacent area, thereby eliminating a potential target of great size for the enemy yet enabling a great number of aircraft to be launched from a certain area almost simultaneously.

A further object of this invention is to provide a portable catapult enabling the launching of radio-controlled airplanes or radio-controlled aerial torpedoes well up near the front and beyond landing fields to permit a more exact control of the radio-controlled airplane or aerial torpedo, it being well known that radio control can be accordingly obtained and maintained over short distances much better than over greater distances.

With the foregoing and other objects in view, the invention consists in the construction, combination and arrangement of parts hereinafter described and illustrated in the drawings, in which:

Figs. 1 and 1A are plan views of the catapult of this invention; and

Figs. 2 and 2A are elevational views of Fig. 1.

There is shown at 10 a truck or trailer body on which the catapult of this invention is carried and from which it is set up. This truck or trailer body is of sufficient length and width so as to carry several track frames, thereby providing the catapult runway. As shown in Fig. 1, three track frames are placed side by side on the trailer body, the body being wide enough to contain these three track frames in side by side relation.

One of these track frames, shown as track frame 221, is located permanently along one edge of the trailer body, while tracks frames 222 and 223 are each removably carried on the trailer body. Track frame 222 is hinged to track frame 221 at 11, this hinge also containing a socket 12 in which may be placed a removable post 13. In order to hold the track frames on the body more securely, the other end of track frame 222 may have a lock pin 14 which extends over into lock pin socket 15 in track frame 221 for holding it against movement; and, similarly, the free ends of track frames 222 and 223 are locked together by the lock pin 16 and the lock pin socket 17.

Lock pin 14 is removed and a guy wire 18 is attached to the top of the post 13 and to the hinge 20 by the track frames 222 and 223. A turnbuckle 21 placed in the guy wire 18 provides means for placing the guy wire 18 under the necessary tension so as to support the track frames 222 and 223 while they are swung around on the hinge 11 to the runway position shown in dot dash at 22 in Fig. 1. A second guy wire 23 and turnbuckle 24 extend between the top of post 13 and the other end of track frame 221 where it is suitably anchored adjacent the lock pin socket 15.

Before commencing to open out the runway, the trailer body 10 would be placed in proper location, as, for instance, by having its rear wheels resting on a suitably located dead man 25 while its front end is supported by means of a jack 26 on another suitably placed dead man 27. To insure against the trailer body accidentally moving from this position, brace wires 28 and 30 may be anchored from the dead men 25 and 27 to the trailer body 10. After track frame 222 is placed into position, its end is supported by a jack 31 similar to the jack 26, a brace wire 32 being anchored between the end of the track frame 222 and the dead man 33 supporting the jack 31. Another removable post 34 is placed in the socket 35 at the hinge 20 and guy wires 36 and 37 are run from the top of the post 34 to the ends of track frames 222 and 223, turnbuckles being likewise provided each of these guy wires. Track frame 223 is then swung about its hinge 20 to the position shown and another jack 31 placed under its free end. In this position, additional brace wires 32 and 38 are secured, as shown, to the additional dead man 33 and the runway formed by the three track frames is then in position for operation. After the jacks 31 have been adjusted to support the track frames in horizontal position, the guy wires and removable posts are all removed, leaving a clear and unobstructed track 40 ready for the passage of the airplane carriage 41 and the airplane carried thereby. This carriage 41 may be actuated by a conventional cable 42 reeved over the sheaves 43 and 44 and actuated by the propulsion chamber 45 in any suitable manner. To assist in placing the airplane on the airplane carriage 41, a telescopic and removable frame 46 may be provided at the front end of the trailer body 10. If desired, the track frame 221, together with the propulsion chamber therein, may be rotatably mounted on the turntable 47 between it and the trailer body 10, thereby permitting the runway to be placed at an angle to the length of the trailer if the direction of the wind or the condition of the ground surface 48 so requires.

If the rear wheels 50 of the trailer body 10 need to be steered, a removable steering wheel 51 and removable steersman's seat 52 may be provided and removed therefrom just in the same manner as is done on the conventional fire truck. Obviously, instead of having the track frames hinged together, as just shown and described, they may be left as separate units to be removed from the trailer body and attached in position in any suitable manner.

Other modifications and changes in the proportions and arrangements of the parts may be made by those skilled in the art without departing from the nature and scope of the invention, as defined in the appended claims.

The invention described herein may be manufactured and/or used by or for the Government of the United States of America for governmental purposes without the payment of any royalties thereon or therefor.

Having thus set forth and disclosed the nature of this invention, what is claimed is:

1. A portable aircraft catapult comprising a land vehicle body and a plurality of catapult track frames on said body, means to attach one of said track frames to said body, to hinge said additional track frames to each other and to said first mentioned track frame, and means for temporarily supporting the free ends of said track frames while they are being swung into operative position.

2. A portable aircraft catapult comprising a land vehicle body and a plurality of catapult track frames on said body, means to attach one of said track frames to said body, means to hinge said additional track frames to each other and to said first mentioned track frame, and means for temporarily supporting the free ends of said track frames while they are being swung into operative position, said temporary supporting means comprising a socket at the hinge between said track frames, a removable post inserted in said socket, and adjustable guy wires extending from the upper end of said removable post to the opposite ends of said track frames.

3. A portable aircraft catapult comprising a land vehicle body and a plurality of catapult track frames on said body, means to attach one of said track frames to said body, means to hinge said additional track frames to each other and to said first mentioned track frame, means for temporarily supporting the free ends of said track frames while they are being swung into operative position, and means for supporting said free end of said track frames in operative position.

4. A portable aircraft catapult comprising a land vehicle body and a plurality of catapult track frames on said body, means to attach one of said track frames to said body, means to hinge said additional track frames to each other and to said first mentioned track frame, means for temporarily supporting the free ends of said track frames while they are being swung into position, means for supporting the free end of said track frame in operative position, said last supporting means comprising dead man means suitably placed on the ground surface, jack means for supporting said track frames in operative position, and brace means secured between said track frames and said dead man means securing said track frames against movement.

PAUL G. HAGENBUCH.